Jan. 29, 1963     W. B. HUCKABAY     3,075,606
MULTIPLE REFLECTION DETERMINATION FOR CONTINUOUS
MARINE ACOUSTIC EXPLORATION

Filed July 1, 1957     3 Sheets-Sheet 1

United States Patent Office 3,075,606
Patented Jan. 29, 1963

3,075,606
MULTIPLE REFLECTION DETERMINATION FOR CONTINUOUS MARINE ACOUSTIC EXPLORATION
William B. Huckabay, Dallas, Tex., assignor, by mesne assignments, to Socony Mobil Oil Company Inc., New York, N.Y., a corporation of New York
Filed July 1, 1957, Ser. No. 669,271
6 Claims. (Cl. 181—.5)

This invention relates to continuous acoustic marine exploration and more particularly to the determination of the presence or absence of multiply reflected events by employing variable pulse repetition rates and detecting signals over like time intervals following each acoustic pulse thus generated.

In conducting acoustic studies of earth formations underlying water-covered areas, repetitive, high energy, highly damped acoustic impulses are generated while traversing a given course or traverse across an area of interest. Such surveys have been employed successfully to delineate subsurface bedding in areas such as the Gulf of Mexico. Although such surveys are limited to formations relatively near the surface, the presence of a structure at much greater a depth is thereby detectable as reflected in the attitude and character of the near surface formations. It has been found desirable to provide representations of the acoustic properties of such subsurface formations in such detail as is possible. Recording systems available for such use are not readily adaptable to provide desired detail over large earth sections. In applicant's co-pending application Serial No. 485,559 filed February 1, 1955 now U.S. Patent No. 2,981,357 there is described and claimed a marine acoustic probe system in which acoustic pulses are generated at a rate of the order of twelve pulses per second. Reflected acoustic energy is recorded continuously. At a rate of twelve pulses per second, energy primarily will be recorded which represents travel to approximately 200 feet in depth. Thus where reflectors are present within the first 200 feet below such a sensing system, deeper reflectors are not directly indicated.

In accordance with the present invention there is provided means for delineating multiple reflections which includes scanning during a predetermined time interval a diagram-receiving medium along a first coordinate thereof at each of a plurality of points spaced closely adjacent one another along a second coordinate thereof. Repetitive control pulses are generated in synchronism with the scanning of the diagram-receiving medium. Acoustic signals are generated at points spaced along a traverse in response to those control pulses which occur at a predetermined multiple of the scanning interval. Recordation of the acoustic signals is initiated in response to a selected one of the control pulses occurring a predetermined time interval following instants of generation of each of the acoustic signals. Acoustic pulses are then generated in response to those control pulses which occur at a different predetermined multiple of the scanning interval. Recordation of the acoustic signals is then initiated in response to the selected one of the control pulses occurring at said predetermined time interval following generation of said acoustic signals.

For a more complete understanding of the present invention and for further objects and advantages thereof, reference may now be had to the following description taken in conjunction with the accompanying drawings in which.

Figure 1:
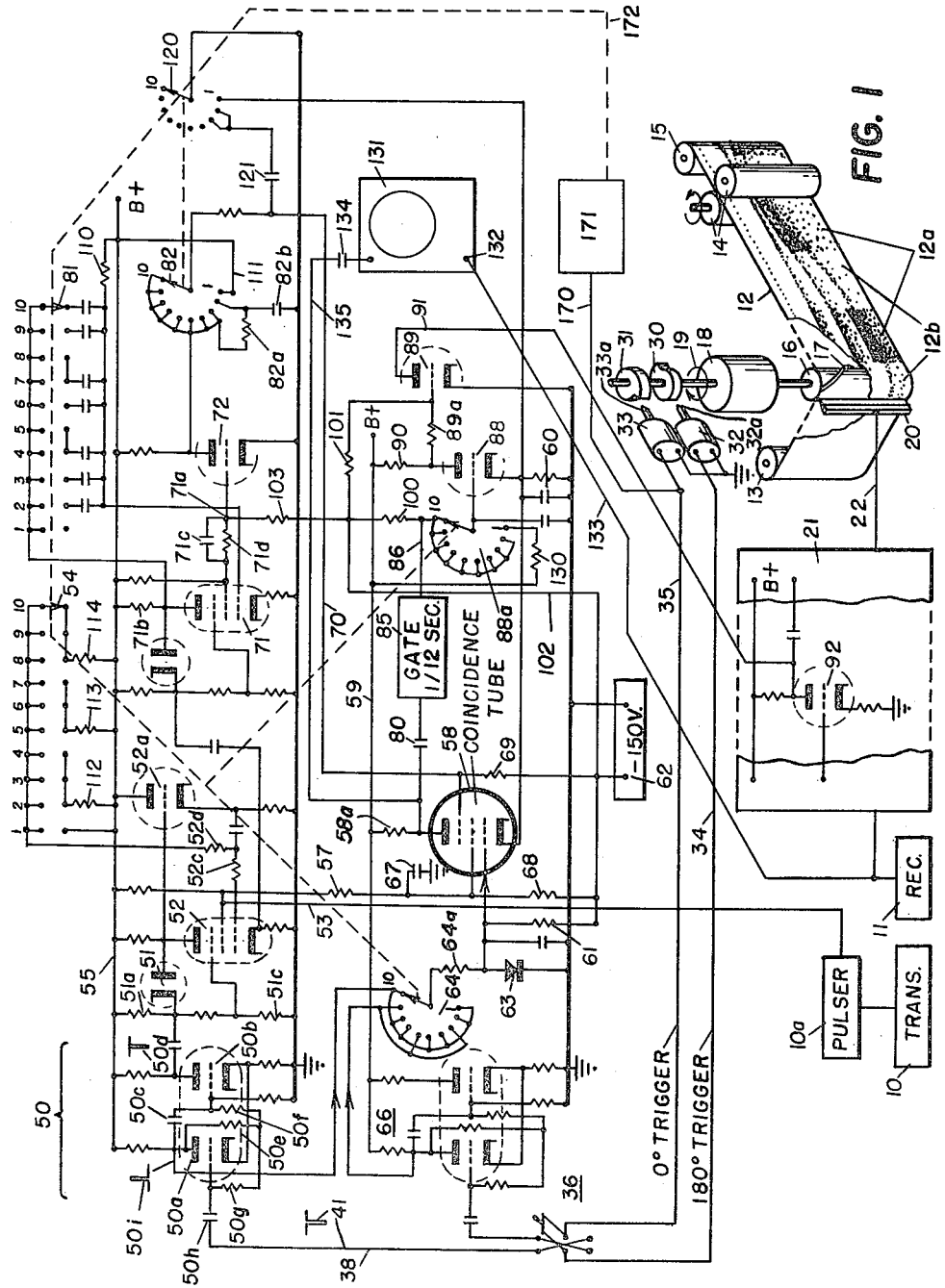
FIG. 1 is a schematic representation partially in block form of one embodiment of the present invention.

The following description of the invention will be based upon the embodiment of FIG. 1 and operations there involved wherein there is employed a coincidence circuit and control means therefor which are described and claimed in the co-pending application of Gerald C. Summers, a co-worker of applicant, entitled Depth Selection for Continuous Marine Acoustic Exploration, Serial No. 669,274, filed July 1, 1957, now U.S. Patent No. 3,034,593.

An acoustic transmitter 10 and a receiver 11 are adapted to be mounted in or secured to a boat with the objective of presenting as on a recording strip or chart 12 a graphical representation of subsurface bedding insofar as it may be sensed acoustically. Chart 12 is driven from a supply roll 13 by driving rolls 14 onto a take-up roll 15. In its path it is threaded over a roller 16 and an electrically conductive spiral 17 mounted on the surface of roller 16. The roller 16 is driven by a motor 18 in the direction of arrow 19. A printing bar 20 is positioned adjacent the cylinder 16 on the side of the chart 12 opposite roller 16. As roller 16 is rotated, the point of registration between bar 20 and spiral 17 travels downwardly across the chart 12 at a linear speed. Thus the coordinate spanning the width of the chart 12 may be representative of a time scale. The coordinate extending along the length of the chart 12 may be made representative either of time or of the distance that the exploring system travels depending upon the manner of energizing drive rolls 14 and upon the calibration thereof.

The intensity of signals recorded on chart 12 will be dependent upon the output of the receiver 11 which is connected through a unit 21 and channel 22 to the recording bar 20. Thus chart 12 will indicate the relationship between three variables, time (or depth), horizontal position or location, and intensity of received signals.

Chart 12 in the form illustrated conveniently may be of electrosensitive paper such that signals from receiver 11 of predetermined amplitude will produce a spark discharge between printing bar 20 and spiral 17. The spark discharge will cause a discoloration of the chart 12. The amplifying and printer control means 21 may be the type illustrated and described in the above-identified application Serial No. 485,559.

The control system shown in FIG. 1 controls the periods of time following the generation of each of a series of acoustic pulses such that signals from receiver 11 will be passed to the printing bar 20 and recorded on chart 12 during any one of a plurality of selected limited time intervals which may readily be related to the structure at a selected depth below the point of generation of acoustic pulses. All operations are synchronized with the repetitive scanning of the recording medium 12 by the contiguous portions of spiral 17 and printer bar 20. Control signals are generated at a repetition rate corresponding with the frequency at which chart 12 is thus scanned. Acoustic pulses are generated at a selected submultiple of the control signal repetition rate for travel to subsurface reflecting interfaces. A control system based upon the use of a coincidence tube in the embodiment shown in FIG. 1 is employed to render the recorder responsive to the output of the receiver 11 for the duration of a period corresponding with the time interval required to scan chart 12.

In accordance with the present invention control signals generated in synchronism or a predetermined time relation with the traverse of spiral 17 across the chart 12 are employed for actuation of the transmitter 10 and for control of the unit 21 which is an amplifier and printer control means. More particularly, a pair of cams 30 and 31 driven by motor 18 are positioned adjacent coils 32 and 33, respectively. Coils 32 and 33 encircle central cylindrical magnets 32a and 33a. The magnet tips extend to points adjacent cams 30 and 31. As the step in the cams passes adjacent the tip of magnets 32a and 33a, an electrical impulse is delivered to channels 34 and 35, respectively. As indicated, the control impulse or trigger signal appearing on channel 35 is so timed by the adjustment of cam 31 relative to spiral 17 that it occurs coincident in time with registration between spiral 17 and the upper end of printing bar 20 adjacent the upper margin of the chart 12. This is referred to as a "0° trigger." The trigger pulse applied to channel 34 will appear in time such that the point of registration between spiral 17 and printing bar 20 is half-way across chart 12. Channels 34 and 35 are connected to the selector arms of a double throw, double pole switch 36 to apply pulses to the control system of FIG. 1 which functions to produce the time sequence of voltages and operations illustrated in FIG. 2.

While other modes of operation may be employed, it will be assumed that motor 18 drives the spiral-carrying cylinder 16 at a rate of twelve revolutions per second so that twelve control pulses will appear on channel 35 each second. At the left hand margin of FIG. 2 there is provided a time scale 40 which together with graph 40a indicates instants that twelve acoustic pulses are generated each second. Acoustic pulses normally are generated in response to and at instants coinciding with the generation of 0° trigger impulses from coil 33. For future reference the 0° trigger pulses occurring in the one second interval of graph 40 are numbered, 41a, 41b ... 41m. Across the top of FIG. 2 it is indicated that in position 1 twelve acoustic pulses are produced each second. Positions 1–10 will correspond with positions of a selector switch later to be described. The stippled area in the intervals between acoustic pulses indicates that in position 1 the recording system is continuously energized. Thus in position 1 signals from 0 to 200 feet in depth are recorded at the rate of twelve events per second.

In positions 2, 3 and 4 represented by graphs 40b, 40c and 40d acoustic pulses are produced at the rate of six per second. In position 2 the recorder is energized for the 1/12 second interval following generation of each acoustic pulse and is thereafter deenergized for a 1/12 second interval. Thus the section from 0 to 200 feet is recorded on recording chart 12 at the rate of six events per second.

It would ordinarily be expected that records produced in operations in switch position 1 and in switch position 2 would be identical. This is generally the case except for the presence of multiply reflected events. In the latter case multiply reflected events which appear in the record produced on position 1 would possibly be eliminated entirely or would be shifted in time when operating in the same zone in switch position 2. The foregoing will be readily understood when it is noted that the time of travel of a given seismic signal to a reflecting horizon and back to the detector is represented by the length of ordinates extending transversely of the length of chart 12. In accordance with the present invention, provision is made for positively identifying multiple reflections by providing a switching arrangement such that pulses may be produced 12, 6, 4 and 3 times per second depending upon the switch position employed. An operator in proceeding along a given traverse may ascertain whether or not a given burst of energy on the resulting record is a true reflection or is a multiple reflection by altering the switch position as from position 1 to position 2 for example and noting the change in character of the resultant record. The same variation may be employed in switch from positions 4 to 5 and from 7 to 8 for checking the reality of reflections from different depth points.

It should be noted that in position 3 acoustic pulses are generated at the rate of six per second and are produced coincident with and responsive to 180° trigger pulses produced from coil 32. Energization of the recorder is delayed following each acoustic pulse by an interval of 1/24 second so that signals are recorded representing the section from 100 feet to 300 feet in depth and at a rate of six events per second.

In position 4 acoustic pulses are generated coincident with and in response to 0° trigger pulses from coil 33. Energization of the recorder is delayed 1/12 second. The recorder is energized to record signals representative of the section from 200 feet to 400 feet in depth.

In graphs 40e, 40f and 40g representing operations at positions 5, 6 and 7, acoustic pulses are produced at the rate of four per second. In position 5 the energization of the recording unit is delayed 1/12 second and is thereafter energized for 1/12 second. Thus signals are recorded during a time interval representative of the subsurface bedding from 200 feet to 400 feet in depth. The record in general will be identical with that obtained in position 4 except that the signals are recorded at the rate of four events per second.

In position 6 pulses are generated coincident with and responsive to 180° trigger pulses. Energization of the recorder is delayed 3/24 of a second following each acoustic pulse. By this means signals representative of depths of 300 feet to 500 feet will be recorded.

In position 7 acoustic pulses are generated coincident with and responsive to 0° trigger pulses. Recording is delayed 1/6 of a second so that signals are recorded representative of depths of from 400 feet to 600 feet.

In graphs 40h, 40i and 40j, representative of operations in positions 8, 9 and 10, acoustic pulses are generated at the rate of three per second. In position 8, recording is delayed 2/12 of a second following each acoustic pulse. Signals are thus recorded representative of a depth of 400 feet to 600 feet. The record thus produced will in general be the same as produced in position 7 except that the recording will be at the rate of three events per second.

In position 9 acoustic pulses are produced coincident with and in response to 180° trigger pulses. Recording is delayed 5/24 of a second following each acoustic pulse. Thus the recording will be representative of the earth section from between 500 feet and 700 feet in depth.

In position 10 acoustic pulses are produced coincident with and in response to 0° trigger pulses. Recording is delayed 3/12 of a second following each acoustic pulse. Thus signals recorded will be representative of the earth section between 600 feet and 800 feet in depth.

While it may be sufficient to provide manual operation of the control switches as between positions 1 and 2, 4 and 5, and 7 and 8 for identifying multiple reflections, provision may also be made for periodically switching from one switch position to another in order automatically to present an indication on the resultant record of the character of the reflections. In FIG. 1 such a system has been illustrated as comprising a control channel 170 leading from the output of coil 33 to a stepping type relay-actuating system 171. Mechanism 171 is coupled as indicated by the dotted line 172 to the selector arms of switches 54, 64, 81, 88a, 82 and 120.

Operation of the mechanism 171 may be such that in response to a selected number of pulses from coil 33, the selector arms of the above switches may be moved from position 1 to 2. Thereafter following a similar number of pulses applied to mechanism 171 from coil 33 the selector arms would be moved back from position 2 to 1. The number of such pulses ordinarily would be large compared to the number of acoustic pulses produced by transmitter 10. For example, mechanism 171 may actuate the switches at intervals of 30 seconds, one minute or five minutes depending upon the requirements for a given area of study. Mechanism 171 has been shown in block form since devices for carrying out the foregoing functions are well known to those skilled in the art.

As indicated in FIG. 1, segments 12a of record 12 represent time intervals during which acoustic pulses are transmitted at a high rate such as 12 per second. The intermediate intervals 12b indicate operations at a lower rate, for example wherein six pulses are produced per second. It is to be noted that secondary reflections appearing in record segments 12a are absent from record segments 12b, clearly indicating the presence of multiply reflected signals. Additionally, the recording is twice as dense in segments 12a as compared to segments 12b since pulse repetition rate is twice as great and since the length of chart 12 is representative of a time scale.

In connection with the foregoing it should be understood that all references to depths have been based upon an assumption that the velocity at which the acoustic pulses travel is the velocity of sound in water or approximately 4800 feet per second. Where pulse transmission involves earth sediments, higher velocities in general will be encountered and thus the depth relationships above identified may not be positively representative of subsurface bedding. However, the picture of the subsurface thus provided on chart 12 is of such a nature as to be of great value to geologists and geophysicists since it provides a rapid and relatively inexpensive reconnaissance study of the subsurface in water-covered areas. For an accurate assignment of depths in any location it would be necessary to obtain a velocity profile. An acoustic velocity log in a borehole at the point of interest would provide the necessary information.

The graph 40j of FIG. 2 will be hereinafter discussed in detail in connection with graphs 40k, 40l and 40m in order to present a description of the mode of operation for position 10 wherein the system is focused to record signals representative of the subsurface section between 600 feet and 800 feet below the transmitter 10, the recorder being energized in the same time relation with respect to generation of each acoustic pulse.

With switch 36 (FIG. 1) in the lower position, 0° trigger pulses 41, sharp voltage excursions negative in polarity, are transmitted from coil 33 through channel 35, switch 36 and channel 38 to the control system having at the input thereof a form of Schmidt trigger circuit represented by circuit 50. Circuit 50 comprises two triodes 50a and 50b. The construction and operation of a basic Schmidt trigger is described in Time Bases by O. S. Puckle, John Wiley & Son, 1955, at page 81 et seq. Quite briefly, in circuit 50, tube 50a normally is conducting and tube 50b normally is cut off. Application of a pulse 41 to the control grid of tube 50a tends to drive that tube to cutoff. The resultant voltage change at the anode of the tube 50a is applied to the control grid tube 50b through condenser 50c and through resistances 50e and 50f. Resistance 50g is much larger than either resistances 50e or 50f. A condenser 50h is also made relatively large to provide a long time constant in the circuit of the grid of tube 50a. The change in voltage across the common cathode impedance together with the change in voltage of the anode of tube 50a effectively raises the voltage of the control grid of tube 50b relative to that of its cathode so that tube 50b begins to conduct. Conduction is thus rapidly shifted from tube 50a to tube 50b but as the voltage on the anode of tube 50a has risen and is coupled back to its control grid, conduction is again transferred from tube 50b back to tube 50a after a time determined by the time constant of the circuit comprising condenser 50h and resistor 50g. Thus there is produced at the anode of tube 50b a sharp rectangular pulse 50d negative in polarity. At the anode of tube 50a a sharp rectangular pulse 50i positive in polarity also appears.

The negative gate pulse 50d is applied by way of diode 51, to the anode of a phantastron counter tube 52. The phantastron counter circuit is of the cathode-coupled type and is provided with a "speed-up triode" 52a which interconnects the control grid and the anode of the tube 52.

The cathode-coupled phantastron circuit of tube 52 is of the type illustrated and described in the above-identified work entitled Time Bases, page 172 et seq. Briefly, however, the anode of tube 52 is normally non-conductive. The negative pulse 50d is applied through diode 51 to the anode of tube 52 and thence to the grid by way of triode 50a. The abrupt change in grid potential causes conduction to shift rapidly from screen to plate or anode resulting in an abrupt decrease in anode voltage which is followed by a gradual linear decline or "run down" to a predetermined level. At such point stability of operation is abruptly restored with the anode of tube 52 again becoming non-conductive. Coincident with pulse 50d, a change in voltage at the screen of tube 52 is applied by way of channel 53 to a transmitter drive unit or pulser 10a which in turn actuates the transmitter to produce an acoustic pulse. During the rundown interval a positive square wave voltage appears at the screen grid of tube 52 and a negative square wave voltage appears at the cathode of tube 52.

A ten-position selector switch 54 is provided to connect the control grid of tube 52 to the B+ bus 55. Variation in the resistance between the control grid and B+ by means of switch 54 will vary the time interval required for the anode voltage of tube 52 to run down to the switching point. Thus there is provided a control for the time duration of the square wave voltages appearing between the screen grid and ground and between the cathode and ground.

Tube 58 is a pentode having its anode connected through a plate resistor to a B+ supply bus 59. Its cathode is connected by way of an RC network 60 to ground.

The control grid of tube 58 is connected by way of resistor 61 to a negative voltage source 62 and to ground by way of the rectifier 63. Voltage pulses derived initially from coils 32 and 33 may be selectively applied to the control grid of tube 58 by way of ten-position switch 64. Terminals 1, 2, 4, 5, 7, 8 and 10 of switch 64 are connected to the anode of tube 50a. Terminals 3, 6 and 9 of switch 64 are connected to the anode of the first tube in a second Schmidt trigger circuit 66. The screen grid of tube 58 is connected to ground by way of a capacitor 67, by way of resistor 68 to the negative terminal of a voltage source 62 and by way of resistor 57 to the screen grid of tube 52. The suppressor grid of tube 58 is connected by way of resistor 69 to the negative terminal of source 62 and by way of channel 70 to the output circuit leading from a second phantastron network which includes the phantastron pentode 71 and the inverter triode 72.

The above circuits cooperate to control the conductivity of coincidence tube 58. This operation may best be understood by reference to the graphs 40j–40m of FIG. 2. The waveform 75 in graph 40k is representative of the gating pulse or voltage which appears at the screen grid of tube 52 as it controls the screen grid of tube 58. Thus the screen grid is alternatively held positive, then negative relative to ground. The voltage build-up and decay of the waveform 75 is delayed by the presence of the capacitor 67. The voltage 76 in graph 40l is representative of the voltage appearing on channel 70 and applied to the suppressor grid of tube 58. Voltage pulses 50i, FIG. 1, coincident with pulses 41a–41m, FIG. 2, are applied at the rate of twelve pulses per second through switch 64 and a resistor 64a to the control grid circuit of tube 58.

In position 10 the voltage waveforms are tailored and applied to tube 58 to permit only voltage pulses 41d, 41h and 41m to be transmitted through the coincidence tube 58 and to prevent all other pulses from being transmitted. As will hereinafter be explained, pulses 41d, 41h and 41m are employed to render amplifier 21 conductive during periods 44, 45 and 46, respectively. Signals from receiver 11 may thus be transmitted to the printing bar 20 during the time intervals 44, 45 and 46 of graph 40j.

More particularly, the anode of tube 48 may be considered to be normally non-conducting. This is so because the screen normally is held at a negative voltage by source 62. Coincident with pulse 41a of graph 40a a highly negative voltage 76, of square waveform, is derived from phantastron tube 71 and is applied to the suppressor grid of tube 58. The voltage on the screen grid gradually rises in manner indicated by the waveform 75. Insofar as the screen grid of tube 58 is concerned, tube 58 may be conductive. However, voltage 76 on the suppressor grid maintains the anode of the tube nonconductive from the instant of pulse 41a to the beginning of interval 44. Immediately prior to the beginning of interval 44, waveform 76 is abruptly terminated. Termination of waveform 76 is selected to be immediately prior to the appearance of pulse 41d by selecting the period of the phantastron circuit of tube 71 as by selecting the position of switch 81. The suppressor grid is thus returned to near cathode potential. In this state, as during intervals such as the intervals 77, 78 and 79, FIG. 2, pulses 41d, 41h and 41m appearing on the control grid of tube 58 will be transmitted from the output circuit of tube 58 by way of condenser 80. Immediately after the appearance of each of pulses 41d, 41h and 41m, the phantastron tube 52 is restored to its normal state, i.e., the suppressor voltage is maintained at a substantially negative value thus preventing conduction through tube 52.

The second phantastron including tube 71 is similar to phantastron 52 though lacking a "speed-up" triode. It is provided with a multiterminal switch 81 which may be employed to connect different values of capacitance between the control grid of tube 71 and the anode thereof whereby the length of pulse 76, FIG. 2, may be selected.

The positive pulse appearing on the screen grid of tube 71 is applied to the control grid of an inverter tube 72 to produce the negative gate pulse 76 at the anode of tube 72.

Pulse 76 is applied through positions 2–10 of a multiterminal switch 82 to the channel 70 leading to coincidence tube 58.

Passage of the control pulses in time graphs 41a–41m through coincidence tube 58 energizes gate unit 85 to produce a control pulse for application to amplifier 21. The gate 85 shown in block form may be of the phantastron type above described. In such case the screen grid voltage from such phantastron tube is applied to the output channel 86. The screen voltage output of the gate 85 is represented by the waveform 87, FIG. 2. The latter voltage is applied to the control grid of an inverter tube 88 whose anode in turn is connected to the control grid of an amplifier control tube 89.

The anode of tube 88 is connected by way of resistor 90 to the B+ conductor common to tube 58. In contrast, the anode of tube 89 is connected by way of channel 91 directly to the anode of tube 92 which forms a part of the signal channel in amplifier 21. The cathode of tube 92 is connected through a cathode resistor to ground and the anode, through an anode resistor to a B+ supply. Signals from receiver 11 are applied to the control grid of tube 92.

The control grids of tubes 88 and 89 are connected together by way of the resistors 100 and 101. The juncture between resistors 100 and 101 is connected by way of conductor 102 to the negative terminal of the bias voltage source 62 and by way of resistor 103 to the screen grid output point 71a of the tube 71. The application of a voltage of positive waveform from circuit 85 by way of channel 86 to the control grid of tube 88 causes the voltage at the anode of tube 88 to drop, carrying with it the control grid of tube 89. When this is the case, tube 89, which effectively is connected in shunt with tube 92, becomes a high impedance. By this action pulse 87 of FIG. 2 serves to remove the shunt from the signal channel of amplifier 21 to permit signals to be transmitted to the printing bar 20.

The voltage from source 62 applied to the control grid of tube 88 normally tends to retain tube 88 nonconducting. Since the anode of tube 88 is connected to the cathode of tube 89, tube 89 normally tends to conduct so that it is of low impedance to shunt amplifier 21. Tube 89 is driven to cutoff and is non-conducting only during intervals represented by the waveform 87. Coincident with the termination of waveform 87 trigger pulse 41e is applied to the Schmidt trigger 50 and the measuring cycle is again repeated.

The foregoing operations are repeated in position 10 at the rate of three per second. More particularly, an acoustic pulse is generated in response to trigger pulse 40e and signals are recorded on chart 12 during the time interval 45. Thereafter an acoustic pulse is generated in response to trigger pulse 41i and signals from receiver 11 are recorded on chart 12 during the time interval 46.

Figure 2:
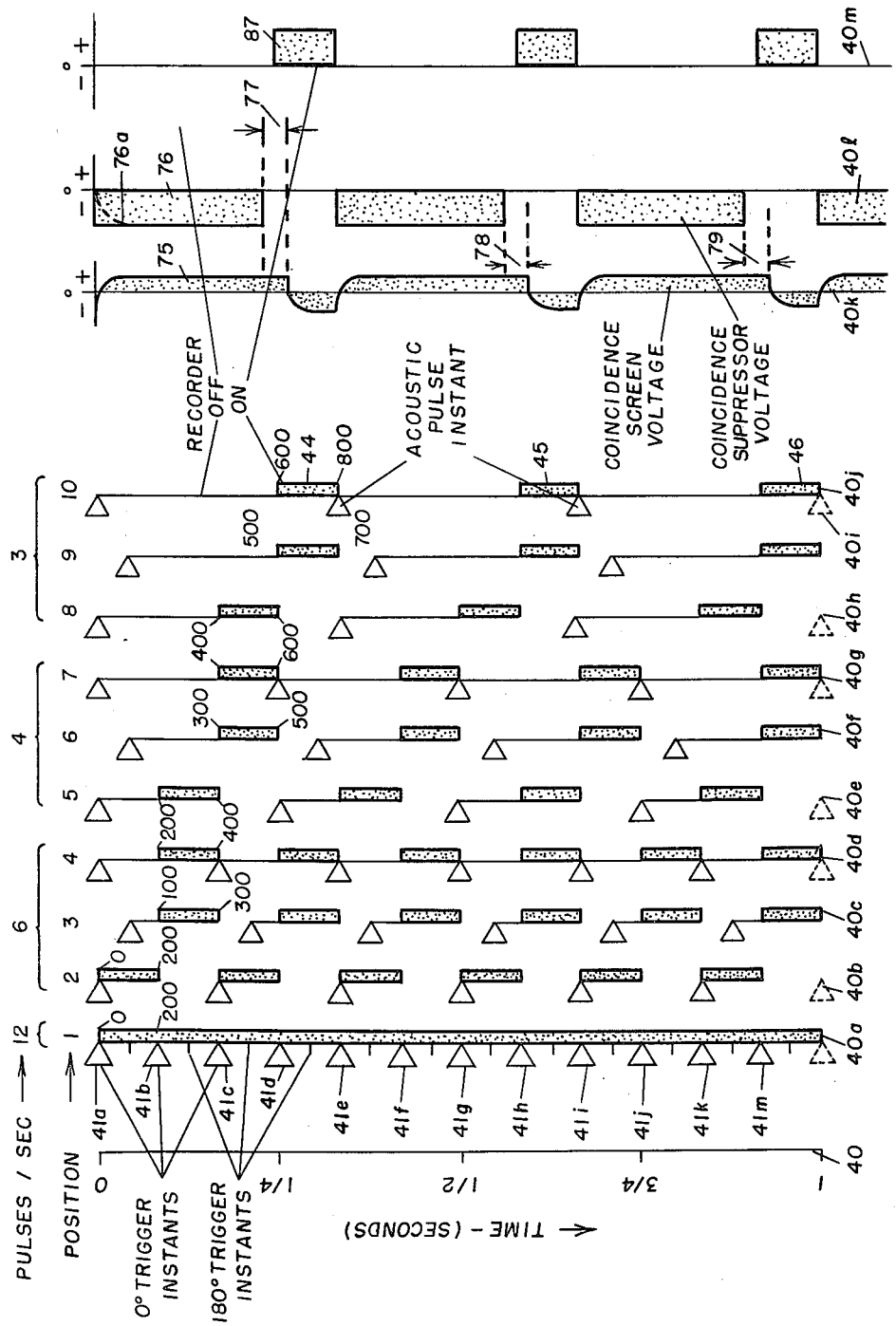
FIG. 2 is a graphical illustration of the time functions performed by the system of FIG. 1.

It will now be apparent that the positions 1–10 of FIG. 2 correspond with the switch positions of selector switches 54, 81, 82 and 64. In conjunction with operations in positions 3, 6 and 9, the switch 36 will be moved to its upper position so that the Schmidt trigger circuit 50 is acutated by 180° trigger pulses. On positions 3, 6 and 9 the 0° trigger pulses are coupled through switch 64 to tube 58 so that each recording interval will begin coincident with a 0° trigger pulse and therefore coincident with registration of the spiral 17 with the upper end of the printing bar 20. While the continuous train of trigger pulses 41a–41m is applied to the control system spaced apart by time intervals equal to the period of a recording cycle as controlled by spiral 17, an acoustic pulse is generated in response to each of the pulses in the train of pulses which occur at intervals a predetermined multiple of the recording cycle. Received signals, representative of reflections of the acoustic pulses, are amplified and those portions of the signals are suppressed which lie outside the time interval between a selected pair of synchronizing pulses which follow generation of each of the acoustic pulses. As will be seen from FIG. 2, the system may be focused to cover any section of submerged strata of approximately 200 feet in length beginning at any depth of 100 foot increments between 0 and 600 feet.

When operating in position 1, the circuit of receiver 21 must be maintained conductive continuously and all acoustic signals impinging receiver 11 will be recorded, depending only upon the amplitudes thereof. Therefore, tube 89 must be maintained cut off at all times. The control grid of tube 88 is maintained positive in switch position 1 by a connection including terminal 1 of switch 88a and resistor 130 which is connected to the B+ conductor 59. Thus while tube 88 is conducting, tube 89 will be cut off and tube 92 will pass all signals to the printer bar 20.

A monitor of a visual nature, such as cathode ray oscilloscope 131, is provided to provide a more detailed presentation of signals from receiver 11. Receiver 11 is connected to the signal input terminal 132 by way of conductor 133. A control channel including condenser 134 and conductor 135 is connected between the trigger input terminal of the monitor 131 and the anode of tube 58. On switch position 1, switch 82 serves to connect the B+ voltage appearing on conductor 111 by way of conductor 70 to the suppressor grid of tube 58 so that each of the pulses applied to the control grid of tube 58 may be transmitted over conductor 135 and condenser 134 to the monitor 131 to synchronize the display of signals from receiver 11 with the generation of acoustic pulses by transmitter 10.

Set out below in Tables I and II are circuit parameters employed in a preferred embodiment of the invention which are given by way of example and are not to be taken as limiting. It should be noted, however, that the lengths of the voltage pulses appearing on the screen grid of tube 52 are controlled by varying the resistance between the control grid and the B+ conductor 55. Resistors 112, 113 and 114 are selected to control the "run down" periods of the phantastron circuit of tube 52 to produce output control pulses of lengths indicated in Table I.

TABLE I

| Position Switch 54 | Pulse Length Screen of Tube 52, milliseconds | Resistance (Ohms) Point 52d to B+ |
|---|---|---|
| 1 | | 470,000. |
| 2 | 100 | 860,000 approx. |
| 3 | 100 | 860,000 approx. |
| 4 | 100 | 860,000 approx. |
| 5 | 200-220 | 2,170,000 approx. |
| 6 | 200-220 | 2,170,000 approx. |
| 7 | 200-220 | 2,170,000 approx. |
| 8 | 280-300 | 2,770,000 approx. |
| 9 | 280-300 | 2,770,000 approx. |
| 10 | 280-300 | 2,770,000 approx. |

The capacitors employed in the phantastron gate circuit of tube 71 are of the values tabulated in Table II to provide voltages of form 76, FIG. 2, of lengths also indicated in Table II.

TABLE II

| Position Switch 81 | Pulse Length Screen of Tube 71 | Capacitance, micro-farads |
|---|---|---|
| 1 | | 0 |
| 2 | 6/48 | 0.12 |
| 3 | 1/48 | 0.02 |
| 4 | 3/48 | 0.06 |
| 5 | 3/48 | 0.06 |
| 6 | 5/48 | 0.1 |
| 7 | 7/48 | 0.14 |
| 8 | 7/48 | 0.14 |
| 9 | 9/48 | 0.18 |
| 10 | 11/48 | 0.22 |

It should be noted that the pulse length, column 2, Table II, changes in uniform steps in switch positions 3 to 10, inclusive. More particularly, the screen grid is normally maintained negative by reason of the connection through resistor 68 to source 62. Coincident with generation of each acoustic pulse the suppressor grid is driven negative to a cut off point and thereafter the screen grid is raised to a conductive point. Prior to the appearance of a selected control pulse the suppressor grid is returned to a conductive level as to permit passage through tube 58 of the control pulse. Thereafter the screen is returned to a highly negative potential in response to the voltage from phantastron tube 52.

As above indicated, the tube 58 is continuously conducting on switch position 1.

However, the logic of operation on switch position 2 is the reverse of that on positions 3–10. In switch position 2 the length of the control pulse which is applied to the screen grid of tube 58 is 6/48 second in length. A delay circuit including resistor 82a and condenser 82b is connected in the signal channel leading from tube 72 through switch 82 to tube 58 so that the leading edge of the control pulse 76, FIG. 2, approaches a transmission value asymptotically as indicated by a dotted line 76a. The onset of voltage 76 illustrated by the dotted curve 76a is less abrupt than that of the voltage on the screen grid illustrated by the curve 75. Thus the screen grid of tube 58 is driven positive to permit an initial conduction therein and the passage of a voltage screen pulse applied to the grid thereof but thereafter the screen grid assumes a negative voltage for the period of 6/48 second as indicated in Table II. This change in the logic for operation on switch position 2 has been found desirable in view of the difficulty in maintaining positive control over the pulse generating-recording operation in view of the appearance of a trigger pulse at the end of each recording interval for switch position 2.

In the above embodiment the following circuit parameters were employed:

| | | |
|---|---|---|
| Tube 52 | | 6AS6 |
| Resistor 51a | ohms | 43,000 |
| Resistor 51b | do | 82,000 |
| Resistor 51c | do | 4,300 |
| Anode resistance—tube 52 | do | 470,000 |
| Cathode impedance—tube 52 | do | 3,600 |
| Resistance 52b | do | 47,000 |
| Resistance 52c | do | 22,000 |
| Condenser 52e | microfarads | 0.22 |
| Tube 52a | | 1/2–12AU7 |
| Resistance 52f | ohms | 56,000 |
| Resistance 57 | do | 220,000 |
| Resistance 68 | do | 220,000 |
| Condenser 67 | microfarads | 1500 |
| Tube 58 | | 6AS6 |
| B+ voltage | volts | 300 |
| Negative bias voltage 62 | do | −150 |

Except as noted below, the circuit parameters of the phantastron of tube 71 were the same as those above noted for the phantastron of tube 52.

| | | |
|---|---|---|
| Resistor 71b | ohms | 330,000 |
| Condenser 71c | microfarads | 10 |
| Resistor 71d | ohms | 1,000 |
| Resistor 103 | do | 1,000 |
| Resistor 100 | do | 680,000 |
| Resistor 101 | do | 470,000 |
| Resistor 89a | do | 820,000 |

Further to assure desired operation on positions 1, 2 and 3, a switch 120 is employed. A condenser 121 is connected between conductor 70 and positions 2 and 3 of switch 120 for aid in control of the voltage waveform applied to the suppressor grid of tube 58. On position 1 switch 120 serves to connect the cathode of tubes 58 and 88 to ground so that tube 88 may conduct continuously thus maintaining tube 89 cut off.

Figure 3:
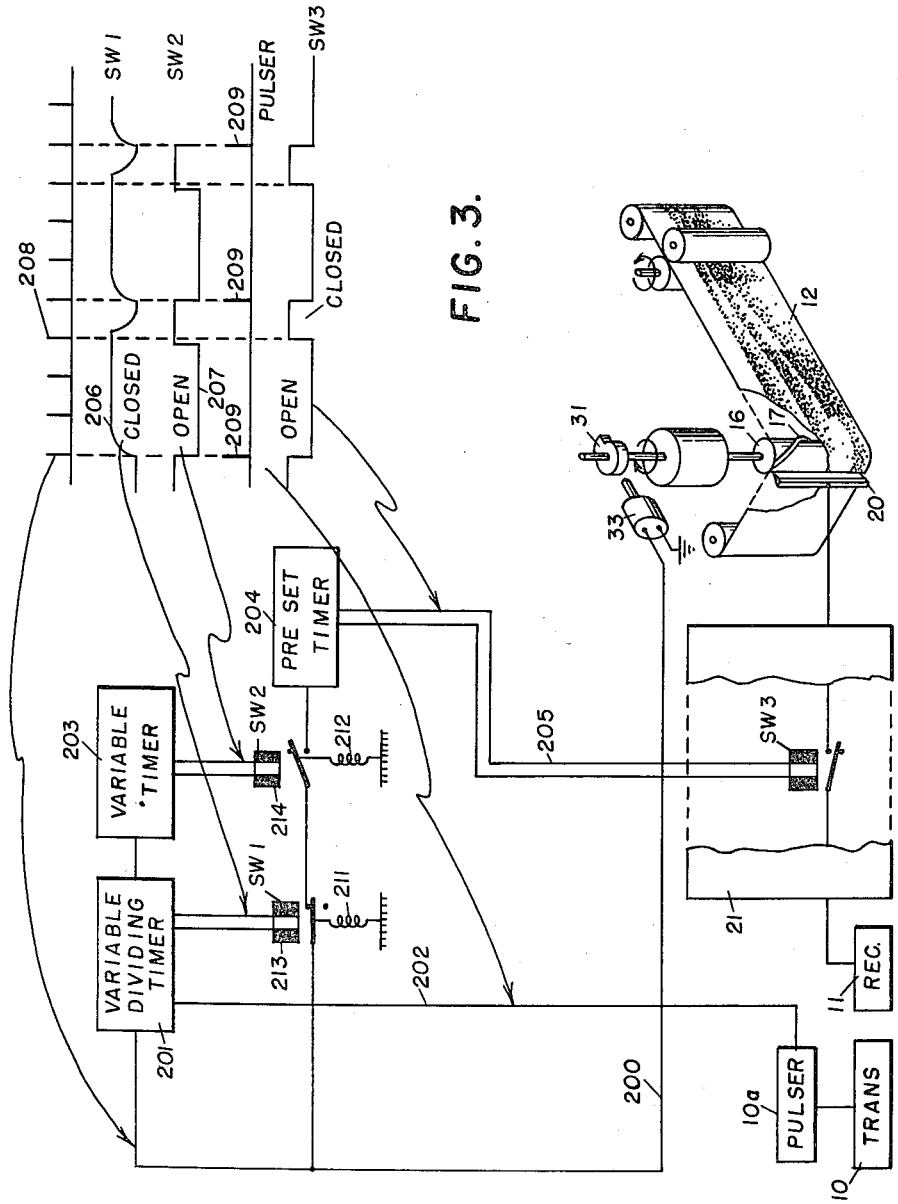
FIG. 3 is a diagram of a controlled receiver amplifier.

Referring to FIG. 3, there is illustrated a modification of the invention partially in block form. Insofar as consistent, like parts have been given the same reference characters as in FIG. 1 where the recorder system includes cam 31 associated with the coil 33 for generating a train of uniformly spaced timing pulses, one pulse being produced for each recording cycle. A recording cycle corresponds with the period required for the spiral 17 on cylinder 16 to sweep the length of the printing bar 20. The acoustic pulse transmitter 10 is actuated by pulses from coil 33 which are applied by way of channel 200 to a variable dividing timer 201. The output of divider 201 is applied to pulser 10a by way of channel 202 so that initiating pulses are applied to transmitter 10 at a rate equal to a predetermined submultiple of the rate of generation of the timing pulses for the production of time-spaced acoustic pulses which travel downwardly from the transmitter 10. A control means for receiver 11 is connected to the control pulse source 33 and includes the variable dividing timer 201, the variable timer 203 and solenoid-actuated switches SW1 and SW2 which switches are responsive to the output of timers 201 and 203, respectively. Pulses from channel 200 are applied by way of switches SW1 and SW2 to a preset timer 204 whose output coupled by channel 205 is adapted to actuate switch SW3 in the receiver-amplifier circuit 21 so that the signals from receiver 11 will be passed to the recorder printing bar 20 during an interval corresponding with one recording cycle. A first control or priming function 206 produced by the variable divider timer 201 closes switch SW1, tending to render the control system conductive. Simultaneously, a second control or priming function 207 is applied to switch SW2 which tends to render the control means non-conductive. The timers 201 and 203 are operative at predetermined times after each initiating pulse such that the functions 206 and 207 change as to permit a pulse 208 to pass through switches SW1 and SW2 to the preset timer 204 whereupon the preset timer by way of channel 205 closes switch SW3 to close the receiver circuit 21 to the printer bar 20. Thus a selected time segment of the acoustic signals detected by receiver 11 resulting from the generation of acoustic pulses by transmitter 10 is applied to the printer bar 20. This cycle of operations is repeated in the interval following generation of each acoustic pulse by transmitter 10 wherein all operations are keyed to the train of pulses such as pulse 208 from coil 33. The periods during which switches SW1, SW2 and SW3 are open and closed is illustrated in the time diagrams of FIG. 3. The operation is based upon the variable divider timer producing initiating pulses 209 at a rate of one-fourth that of the timing pulses such as pulse 208.

Thus it will be seen that switches SW1 and SW2 are both closed only during an interval that a selected one of the timing pulses occurs and the channel leading to the preset timer 204 is maintained open at all other times by either switch SW1 or SW2. It should be noted that switch SW1 is maintained open by a spring 211. Switch SW2 is normally maintained closed by a spring 212. Only upon energization of the associated coils 213 and 214 will the armatures of the switches be moved from their normal position.

The system of FIG. 3 may thus be considered as a system mechanical in part which may be employed to perform control operations illustrated in FIG. 2. As the diagram-receiving medium or chart 12 is scanned along a first coordinate at a plurality of points spaced closely adjacent one another along the length thereof, repetitive control pulses are generated in synchronism with the scanning operation. Acoustic signals are generated at points along a traverse in response to these control pulses which occur at a predetermined multiple of the time interval required to scan the diagram-receiving medium 12. The recording of signals from receiver 11 is then initiated in response to a selected one of the control pulses intermediate the instants of generation of the acoustic signals. In FIG. 1 a multi-element vacuum tube has been illustrated as having at least three control means intermediate the cathode and anode thereof. Each of the train of pulses from coil 33 is effectively applied to one of the control electrodes. The counting system and timing system connected to coil 33 serve to apply control functions to the second and third control elements of tube 58 where such control functions are of predetermined different lengths with the average of such lengths being equal to a multiple of the period required for spiral 17 to scan the recording medium 12 to render the tube 58 conductive to selected electrical impulses which occur at intervals corresponding with said average period so that as the transmitter 10 is energized coincident with the beginning of each of the control functions the resultant acoustic signals will be recorded on chart 12 intermediate each pair of acoustic pulses from transmitter 10.

While the invention has been described in connection with certain specific embodiments thereof, it will now be understood that further modifications will suggest themselves to those skilled in the art and it is intended to cover such modifications as fall within the scope of the appended claims.

What is claimed is:

1. A marine exploration system for detecting multiply reflected acoustic signals which comprises means for generating a train of uniformly spaced timing pulses, a recorder having a recording cycle of duration corresponding with the interval between said timing pulses, an acoustic pulse transmitter and an acoustic pulse receiver, means for applying initiating pulses to said transmitter at rates equal to at least two predetermined submultiples of the rate of said timing pulses to produce time-spaced acoustic pulses, control means connected to said generating means adapted to pass signals from said receiver to said recorder during an interval corresponding with said recording cycle, means for applying a first control function to said control means coincident with each of said initiating pulses which control function tends to render said control means conducive, means for simultaneously applying a second control function to said control means which tends to render said control means non-conductive, and timing means operative at predetermined times after each of said initiating pulses for changing said first and second control functions to render said control means responsive to one of said timing pulses intermediate each pair of acoustic pulses whereby said control means transmits to said recorder the same time segment of the acoustic signals resulting from gneration of said acoustic pulses independently of said rates.

2. The combination of claim 1 in which means are provided for maintaining the rate of said initiating pulses first at one value and then at another for time periods which are long compared with said interval.

3. In exploration where a series of time-spaced acoustic pulses are generated, one at each of a plurality of points along a traverse, for travel through the earth to sub-surface interfaces and reflection back to said points, the method of identifying multiple reflections which comprises generating said pulses at a first repetition rate along a first segment of said traverse, generating a first set of time variable signals in response to reflections of said acoustic pulse from said sub-surface interfaces as they arrive at said first segment, recording said first set of time variable signals along a predetermined time scale to produce a first set of recorded signals, generating said pulses at a second repetition rate along a second segment of said traverse adjacent to said first segment, generating a second set of time variable signals in response to reflections of said acoustic pulses from said sub-surface interfaces as they arrive at second segment, and separately recording said second set of time variable signals on the same time scale as said first set of time variable signals and adjacent to said first set of recorded signals for producing at the boundary between said first and second set of recorded signals a discontinuity in the recording of multiple reflections.

4. In exploration where a series of time-spaced acoustic pulses are generated, one at each of a plurality of points along a traverse, for travel through the earth to sub-surface interfaces and reflection back toward said points, the method of identifying multiple reflections which comprises generating said pulses at a first repetition rate along a first segment of said traverse, generating a first set of time variable signals in response to reflections of said acoustic pulses from said sub-surface interfaces as they arrive at said first segment, recording along a time scale the fraction of each signal of said first set of time variable signals beginning a selected time interval after generation of each acoustic pulse to produce a first set of recorded seismic signals, generating said pulses at a second repetition rate along a second segment of said traverse adjacent to said first segment, generating a second set of time variable signals in response to reflections of said acoustic pulse from said interfaces as they arrive at said second segment, and separately recording adjacent to said first set of recorded seismic signals and along said time scale the fraction of each signal of said second set of time variable signals beginning the same selected time interval after each acoustic pulse generated at said second rate for producing a discontinuity in multiple reflections at the boundary between said first and second set of recorded seismic signals.

5. The method set forth in claim 3 in which acoustic pulses are generated alternately at said first rate and at said second rate.

6. The method set forth in claim 3 in which said acoustic pulses are generated at said first rate and at said second rate in periodic succession of one of generation and then at the other rate of generation.

References Cited in the file of this patent

UNITED STATES PATENTS

| | | |
|---|---|---|
| 2,788,509 | Bolzmann | Apr. 9, 1957 |
| 2,866,512 | Padberg | Dec. 30, 1958 |

FOREIGN PATENTS

| | | |
|---|---|---|
| 711,139 | Great Britain | June 29, 1954 |